US006631305B2

(12) United States Patent
Newmark

(10) Patent No.: US 6,631,305 B2
(45) Date of Patent: Oct. 7, 2003

(54) CAPABILITY ANALYSIS OF ASSEMBLY LINE PRODUCTION

(75) Inventor: Larry J. Newmark, Pittsfield, MA (US)

(73) Assignee: General Electric Company, Pittsfield, MA (US)

( * ) Notice: Subject to any disclaimer, the term of this patent is extended or adjusted under 35 U.S.C. 154(b) by 217 days.

(21) Appl. No.: 09/844,456

(22) Filed: Apr. 27, 2001

(65) Prior Publication Data

US 2002/0026257 A1 Feb. 28, 2002

Related U.S. Application Data

(60) Provisional application No. 60/201,467, filed on May 3, 2000.

(51) Int. Cl.[7] .............................................. G06F 19/00
(52) U.S. Cl. .................... 700/110; 700/108; 700/122
(58) Field of Search ............................ 700/1.173, 108, 700/110, 112, 122; 752/180

(56) References Cited

U.S. PATENT DOCUMENTS

| 3,648,035 | A | * | 3/1972 | Hart et al. .................. 700/122 |
| 5,229,948 | A | | 7/1993 | Wei et al. |
| 5,452,218 | A | * | 9/1995 | Tucker et al. ............... 700/110 |
| 5,715,181 | A | | 2/1998 | Horst |
| 5,731,572 | A | | 3/1998 | Winn |
| 5,777,841 | A | | 7/1998 | Stone et al. |
| 5,956,251 | A | | 9/1999 | Atkinson et al. |
| 6,101,826 | A | | 8/2000 | Bessler |
| 6,184,048 | B1 | | 2/2001 | Ramon |

OTHER PUBLICATIONS www.tbmcg.com; Bob Dean "Defining Lean Sigma™", *Managing Times*, 2nd Quarter 2001.
www.tbmcg.com Mark Oakeson, "Design for Lean Sigma™", *Managing Times*, 2nd Quarter 2001.
www.tbmcg.com Mike Serena, Ph.D., "Measuring Your Company's Continuous Improvement", *Managing Times*, 2nd Quarter 2001.

* cited by examiner

*Primary Examiner*—Leo Picard
*Assistant Examiner*—W. Russell Swindell

(57) ABSTRACT

The present invention provides a process and means for identifying opportunities for improvement in assembly line production that overcomes the problem of overlooking opportunities for improvement. Six sigma techniques are used to identify these opportunities. The process includes collecting time data accurately representing operations in an assembly line; conducting a capability analysis of the data collected to identify opportunities for improving operations; identifying changes in operations based on this analysis; and implementing such changes into operations to produce improved assembly line performance. Capability analysis of the data using statistical techniques is a more rigorous and thorough approach than traditional assembly line optimization techniques. The present invention targets opportunities for improvement that would otherwise be overlooked.

25 Claims, 2 Drawing Sheets

CAPABILITY ANALYSIS OF ASSEMBLY LINE PRODUCTION

CROSS-REFERENCE TO RELATED APPLICATIONS

This application is entitled to the benefit of Provisional Patent Application Serial No. 60/201,467 filed May 3, 2000.

BACKGROUND OF THE INVENTION

This invention relates to a process for optimizing assembly line operations, and more particularly, to a process implementing certain aspects of the six sigma quality analysis program with lean production techniques to identify opportunities for improvement in assembly line production.

Traditional manufacturing processes often encompass single skilled operators, high work in process (WIP) inventories, constant expediting, and production schedule shuffling. These features add limiting effects, such as inefficiency in output, manpower, WIP inventories, and assembly line operations. Therefore, it would be desirable to utilize a process for evaluating and improving a manufacturing or assembly process.

Originally lean production was implemented in manufacturing or assembly line processes to overcome the problems associated with traditional manufacturing. Lean production was based on the Toyota manufacturing system and typical practices can be found in *The Machine that Changed the World*, by James P. Womack, 1991, Harper Collins Publishing Co. The basic philosophy of the lean production system is to manufacture in the most economical way possible. This is accomplished by focusing on meeting customer requirements, such as determining production time.

One of the key elements of lean production is producing to takt time. Determining takt time is an essential first step in analyzing an assembly line. Takt time is the rate in time that a plant must maintain to meet customer demand. One of the basic tenets of lean manufacturing is that if each operation is done in the same amount of time, e.g. at or below the takt time, then the result will be an efficient one-piece flow process. Control steps are often implemented to maintain continuous improvement in the assembly line. This is based on Kaizen techniques such as those found in *The New Manufacturing Challenge: Techniques for Continuous Improvement*, by Kiyoshi Suzuki, 1987, Free Press.

Typically in assembly lines these techniques based on takt time were used to balance the work of the individual operations and thus optimize the overall flow and efficiency of the assembly line. For example, all workstation operations or machines in a cell area produce to takt time to prevent over or under production. The following is an example of how takt time can be calculated where there are operations having 2 shifts per day, with 7.5 hours per shift, with 5 work days per week, and the demand of 150 pieces per week:

$$\text{Takt time} = \frac{\text{Total Production Time Available}}{\text{Demand}}$$

$$\text{or Takt time} = \frac{\text{shift operation} \times 7.5 \text{ hrs. per shift} \times 5 \text{ days per week}}{150 \text{ pieces per week}}$$

such Takt time = 0.5 hours or 30 minute

A lean production assembly line takt time analysis typically uses the average time in each operation of the process. However relying solely on the average values can result in missed opportunities for improvements in the assembly line or manufacturing process. Therefore, it would be desirable to efficiently obtain information on the variability and process capability of these operations to target missed improvement opportunities and to optimize process improvements. In part, there is a need for a more rigorous method than using average times for determining assembly line performance.

Six sigma methodology makes use of various statistical tools that workers and managers use to measure quality, both in development and production. One or more techniques can be used for the analysis and detailed illustrations of these techniques are found in *Implementing Six Sigma: Smarter Solutions Using Statistical Methods*, by Forrest W,. Breyfogle, III, 1999, John Wiley & Sons. These techniques include measurement validation techniques utilizing gage reproducibility and repeatability (gage R & R); variation analysis utilizing and standard deviation and mean; capability analysis utilizing process capability (CpK); improvement validation using confidence interval measurements; and determining primary goals such as those critical to quality (CTQ). However, these techniques have been primarily used to decrease product defects, which typically involved correcting product attributes that did not meet customer product quality requirements. Therefore, it would be desirable develop a new rigorous application implementing six sigma techniques, such as targeting opportunities for improvement in assembly line processes.

SUMMARY OF THE INVENTION

The present invention provides a process and means for identifying opportunities for improvement in assembly line production that overcomes the problem of overlooking opportunities for improvement. Six sigma techniques are used to identify these opportunities. The process includes collecting time data accurately representing operations in an assembly line; conducting a capability analysis of the data collected to identify opportunities for improving operations; identifying changes in operations based on this analysis; and implementing such changes into operations to produce improved assembly line performance.

One or more six sigma techniques used for identifying opportunities for improvement comprise gage R&R measurement validation; variation analysis utilizing mean values and standard deviation values; capability analysis utilizing process capability (CpK); utilizing confidence interval analysis; and implementing primary goals such as those critical to quality (CTQ).

The process of the present invention preferably utilizes a capability analysis comprising at least one of the following processes, analyzing overall process performance, analyzing individual operations in a process, predicting process performance, and serving as a basis for implementing steps in process optimization. In one aspect, the capability analysis of the operations comprises the calculation of the mean, standard deviation, process capacity (CpK), and a first set of confidence intervals obtained from the original assembly process, to identify system process time performance weaknesses, or defects. In another aspect, capability analysis comprises a second set of confidence intervals based on the assembly line after improvements are implemented to compare with the first set of confidence intervals obtained from the original data to validate improvements.

In yet another aspect, identifying changes in operations in an assembly line comprises improving those activities that yielded the highest operation data values in any given set of data to shift the process capability mean values lower than those originally obtained and to decrease the standard deviation values of that operation.

The process of the present invention preferably identifies opportunities for improvements in an assembly line comprising the steps of obtaining and validating takt time measurements using gage R&R analysis; conducting capability analyses on the overall process as well as each individual operation to determine opportunities for improvement; generating ideas to eliminate waste and improve performance through minimizing variability, balancing work of operations, and improving layout and flow; testing best ideas; implementing successes; documenting standard operations for controlling changes implemented; and repeating the cycle to maintain a continuous improvement flow.

The implementation of six sigma techniques gives the user flexibility to conduct rapid capability analysis of a process and implement improvements to ensure that each operation in an assembly process is at or below a specified takt time.

BRIEF DESCRIPTION OF THE FIGURES

FIG. 1 depicts the total process capability and statistics in Example 2 before changes were implemented in the assembly line.

DETAILED DESCRIPTION

Figure 1:
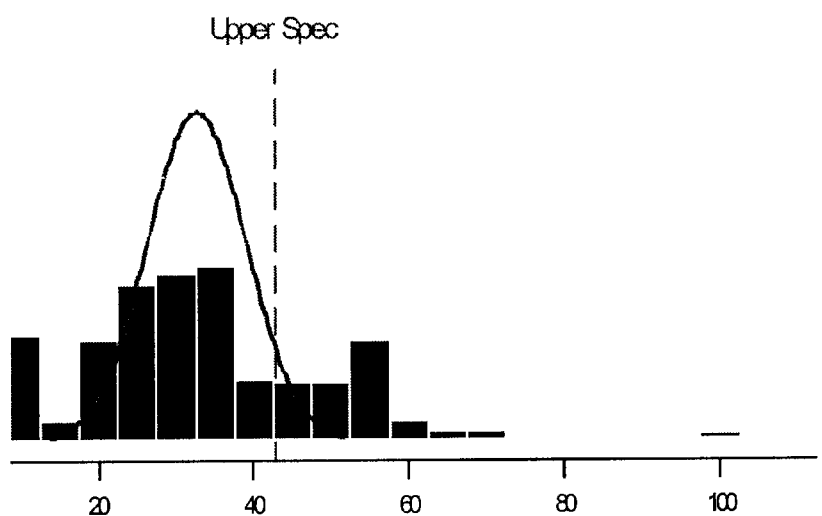
FIG. 1 depicts a typical capability analysis graph and the statistical data typically calculated, however, more specifically

Processes and means for identifying opportunities for improvement in assembly line production involve: collecting the time data accurately measuring operations in an assembly line; conducting a capability analysis of the data collected to identify opportunities for improving operations; identifying changes in operations based on this analysis; and implementing such changes into operations to produce improved line performance.

An opportunity for improvement, or defect in an assembly line is defined herein as a time for an operation that takes longer than an overall process takt time. It has been discovered that the key to minimizing defects in assembly lines is to first focus on reducing process time variation. According to the process of the present invention, assembly line process time variation can be identified using six sigma capability analysis. More rigorous methods can then be used to reduce or minimize variation. While traditional takt time techniques using averages alone do not take process variation into account, it has been discovered that implementing a more rigorous six sigma analysis using six sigma tools is extremely beneficial in optimizing overall assembly line process time as well as individual assembly operational times.

Six sigma encompasses the Define-Measure-Analyze-Improve-Control (DMAIC) methodology. Each stage utilizes corresponding procedures and tools. Examples include measurement validation techniques like gage R&R; statistical tools like standard deviation and capability analysis, and designating primary goals such as those critical to quality (CTQ).

A preferred process implementing six sigma methodology for identifying opportunities for improvement comprises the steps of observing and validating the current process time measurements, analyzing the process time measurements to target opportunities for improvement, generating ideas to eliminate waste and improve performance, balancing work of operations, improving layout and flow, testing the best developed ideas, implementing successes, documenting new standard operation(s), and repeating the cycle.

The process for identifying opportunities for improvement comprises selecting at least one assembly line that will serve as the basis for the evaluation. An assembly line comprises two or more operations or operators manufacturing in a sequence. Assembly lines can be automated or non-automated.

Once an assembly line is selected, the time data is collected for the overall process as well as each individual operation of the assembly line. Collecting data for analysis comprises validating the timing of operations and the measurements obtained therefrom. Qualifying those doing the timing of operations and their techniques used is preferably accomplished using a gage R & R analysis. The most preferable is a short gage R& R analysis. Short gage R& R is a tool used to assess the variation in the measurement system due to the combined effect of reproducibility and repeatability. An advantage of this tool is that it requires only two measurers and five repetitions of the assemble operation to complete the analysis.

The short gage R&R analysis is used as a practical matter because with the measurement of an assembly operation time, the actual cycle can only be measured a single time. The preferable short gage R&R analysis employed only uses the upper specification limit (USL) when evaluating whether the operation is being performed below the required takt time.

Short gage R&R generally proceeds with at least one pair of measurers measuring the time of the operation usually at least five times. That is, the operators repeat the operation five times, and each of the two measurers record the five times for a total of ten data points. These data points are then preferably put in a basic spreadsheet. A typical gage R&R analysis is shown in Table 1 and Table 2 below:

TABLE 1

Gage R&R Analysis

| Parts | Part Measurements | | | |
|---|---|---|---|---|
| | Individual A | Individual B | \|Range (A–B)\| | Average |
| 1 | 35.6 | 34.5 | 1.1 | 35.05 |
| 2 | 33.8 | 34.3 | 0.5 | 34.05 |
| 3 | 34 | 33.9 | 0.1 | 33.95 |
| 4 | 35.4 | 35.5 | 0.1 | 35.45 |
| 5 | 33.7 | 31.4 | 2.3 | 32.55 |
| | | Average Range: | 0.82 | |

Gage Error (GRR): 3.5506
GRR % Contribution: 34.4% Red

TABLE 2

Gage R&R Analysis

| Parts | Part Measurements | | | |
|---|---|---|---|---|
| | Individual A | Individual B | \|Range (A–B)\| | Average |
| 1 | 55.8 | 55.7 | 0.1 | 55.75 |
| 2 | 57 | 57 | 0 | 57 |
| 3 | 71 | 72.5 | 1.5 | 71.75 |

TABLE 2-continued

Gage R&R Analysis

Part Measurements

| Parts | Individual A | Individual B | \|Range (A–B)\| | Average |
|---|---|---|---|---|
| 4 | 68 | 68.2 | 0.2 | 68.1 |
| 5 | 69 | 69.2 | 0.2 | 69.1 |
|  |  | Average Range: | 0.4 |  |

Gage Error (GRR): 1.7320
GRR % Contribution: 0.2% Green

If the gage R & R, as a percent of contribution to error, is less than 2%, the measurement system is green, or acceptable; if the gage R & R is between 2% and 7.7%, it is yellow or marginal; if the gage R & R is greater than 7.7%, it is red, or unacceptable. In Table 1 above, the gage R & R % contribution was calculated to be 34.4%. That was unacceptable. There are numerous ways to fix the gage R & R, such as following recognized techniques. For example, the techniques the measurers used in timing the operations can be discussed. The start time and end time can be defined more precisely, the data collecting procedures changed, and a second set of measurements taken. In Table 2 above, the gage R & R % contribution was calculated to be 0.2%. That was acceptable based on the defined criteria.

The analysis of process capability of whatever is made or done to specification, what is required, is referred to as capability analysis. The most preferred capability analysis comprises calculating the mean, standard deviation, and process capability (CpK) values of the overall system, such as an assembly line and each individual operation. This is used as a performance metric of a process compared to a standard. For example, in the case of identifying opportunities for improvement in assembly lines, the metric on the performance of the line is with respect to a takt time standard. Therefore, in the present invention, an opportunity for improvement is a defect in an assembly line comprising an operation time that takes longer than an overall process takt time.

Takt time is preferably the frequency at which a completed unit must come off the line in order to meet customer demand. The takt time is calculated by dividing the available production time by the demand. For example, if the available production time is 7 hours, and the customer demand is for 1000 units, then the takt time is 25.2 seconds. This is interpreted to mean that if an assembly line were balanced, each operation should be completed in 25.2 seconds or less. This is the upper specification limit (USL).

The CpK, or process capability is evaluated as part of the capability analysis. CpK measurement shows how capable an operation is in completing an operation in less than a upper specification limit (USL) takt time. CpK indicates how well centered the data is to a nominal mean value and indicates things such as poor design centering, lack of process control, poor quality components, or that some critical parameter has changed over the course of the process. CpK can be determined by using either of the following formulas:

$$CpK = \frac{\min(USL - mu)}{3\ sigma} \text{ or } \frac{\min(mu - LSL)}{3\ sigma}$$

where,
USL=upper specification limit
LSL=lower specification limit
mu=mean
sigma=the Short Term standard deviation (within lot) versus Long Term standard deviation (between lots).

In the present invention there is no Lower Specification Limit (LSL) contemplated. Therefore, to calculate CpK, the equation requiring only the Upper Specification Limit (USL) is used.

The preferred method to conduct capability analysis is through the use of statistics, such as determining process capability (CpK), standard deviation, and mean values. The preferred capability analysis comprises entering time data collected into a spreadsheet with a means for conducting statistical analysis. The preferred means for conducting statistical analysis is Minitab™ software. Experience has shown that collecting ten data points on each operation of an assembly line is sufficient for analysis purposes. It is preferred to arrange time data using a sub group size of ten since there are ten measurements per operation. A typical capability graph and associated statistic results are shown in FIG. 1.

The entire capabilities analysis of the whole assembly process is represented in a capability analysis graph. Typically results from capability analysis include CpK, standard deviation, and the mean. The most preferred capability analysis comprises analyzing the overall process and each individual assembly operation. Table 3 is an example showing data for analyzing the individual operations from a capability analysis:

TABLE 3

Capability Analysis of Individual Operations

| Station | Ave. Time | Std. Deviation | Cpk |
|---|---|---|---|
| overall | 104.5 | 11.0 | 1.20 |
| 1 | 78.6 | 9.8 | 2.23 |
| 2 | 118.8 | 6.2 | 1.36 |
| 3 | 108.8 | 7.0 | 1.67 |
| 4 | 106.4 | 18.1 | 0.69 |
| 5 | 119.4 | 12.7 | 0.64 |
| 6 | 94.8 | 9.5 | 1.72 |

Typically, standard deviation represents variation and CpK assesses process capability in individual operations that affect the overall process. Evaluating process capability (CpK) and the standard deviation (sigma) of each step in an assembly line is a quick way of determining the overall efficiency of a process. Variation and lack of controlled process capability can be improved by redistributing work, improving ergonomics, changing operators, including standard operating procedures, changing cell layout, and the like. The key to process improvement is the elimination or at least minimization of variation. Reducing the highest standard deviations in a given set of data points will increase process capability (CpK). This reflects a more controlled process with higher overall capability.

A typical capability analysis also comprises interpreting data obtained from a capability analysis. An analysis of Table 3 above represents how information from the capability graph and charts is put together to efficiently target opportunities for improvement in an assembly line. Analysis of Table 3 begins with noting the overall assembly line process time is 104.5 seconds. The focus is on eliminating high process time values to decrease the standard deviation and lower the process time mean. This initially targets stations 2 and 5, which have mean takt time values, 118.8 and 119.5, respectively. These are well above the overall process time. However, the analysis does not stop at eliminating the high mean process time values. The standard deviation and process capability are also contemplated in assessing problematic areas in the process. Note Station 4 where the standard deviation is 18.1 and CpK is 0.69. These numbers are flags indicating a problem area. Although the average process takt time of Station 4 is not significantly higher than the overall process time, that standard deviation indicates a high amount of variation in the process and the low CpK indicates an uncontrolled process. By focusing on these values as well as the average process takt times, opportunities for improvement are not overlooked. Concentration of efforts on specific operations may conclude with the capability analysis. However, it is most preferred to analyze future actions by implementing improvements discovered in the prior analysis.

Improvements are implemented in various ways and typically begin with generating ideas to eliminate waste and improve assembly line performance based on the capability analysis results. The generated ideas are centered around the process takt time. The focus is to minimize variability, balance work of operations, and improve the layout and flow of the assembly line process. Generally, improvements focus on cell layout, process improvements, consolidation of operations, removal of unnecessary process steps, and improving material handling.

The next step includes determining whether the improvements identified and implemented in the assembly process are valid. Validation of improvements preferably comprises determining a first set of confidence intervals for the overall process before improvements are implemented and comparing them to a second set of confidence intervals based on the assembly line after the improvements are made. The preferred improved processes or operation changes measured comprise reduced takt time. The most preferred confidence interval analysis compares the current process takt time with the improved assembly line takt time. An improvement is validated if the second set of confidence intervals based on the improvements made in the assembly process does not overlap the first set of confidence intervals obtained from the original process. A confidence interval evaluation includes placing data in a worksheet and implementing a means for calculating the confidence intervals. The preferred confidence interval calculations performed by the statistical software comprise Z short term (Zst) and DPMO (defects per million opportunities) confidence intervals such as those included in *Statistical Intervals*, by G. J. Hahn and W. Q. Meeker, 1991, Wiley-Interscience. Z short term is the sigma value and is estimated by the formula: CpK×3. This calculation is used to measure the assembly process after the changes are implemented to improve the assembly line. For example a process having an improved CpK value of two (2) would have a new sigma value of six (6) and represents a process capability of 3.4 defects per one million opportunities (DPMO).

An example of worksheets representing the information generated in confidence interval analyses of the assembly line process time are shown below in Table 4 below:

TABLE 4

Total Production Line Before and After Changes Implemented

| CTQ[1] | DPMO[2] | Yield | Shift | Zst[3] | Zlt[4] |
|---|---|---|---|---|---|
| Old Total Line | 237,000 | 76.25% | 1.50 | 2.21 | 0.71 |
| New Total Line | 0 | 100.00% | 1.50 | — | — |

Confidence Interval Analysis
Confidence Limits (alpha = 0.05)

| | On DPMO | | On Z st | |
|---|---|---|---|---|
| CTQ[1] | lower | upper | lower | upper |
| old line total takt time(before) | 185,123 | 296,485 | 2.03 | 2.4 |
| new line total takt time(after) | — | 26.005 | 3.44 | — |

[1]Critical to Quality (CTQ) metric evaluated, such as takt time.
[2]DPMO = Defects per million opportunities
[3]Zst = Z short term = σ value = CpK × 3, for example a 6σ value would be 3.4 defects out of 1 million opportunities (DPMO)
[4]Zlt = Z long term, not included in confidence interval analysis Another application of this type of analysis technique is to evaluate different "what if", or theoretical scenarios. Typically this includes changing the CTQ (critical to quality) goal. For example, the required takt time can be modified to see how capable the process is at different hypothetical takt times. Table 5 below represents this type of analysis:

TABLE 5

Various Modified Takt Time Capability Analysis
Validation and Confidence Interval Analysis

| CTQ[1] | DPMO[2] | Yield | Shift | Zst[3] | Zlt[4] |
|---|---|---|---|---|---|
| T1 | 0 | 100.00% | 1.50 | — | — |
| T2 | 66,667 | 93.33% | 1.50 | 3.00 | 1.50 |
| T3 | 100,000 | 90.00% | 1.50 | 2.78 | 1.28 |
| T4 | 200,000 | 80.00% | 1.50 | 2.34 | 0.84 |

Confidence Interval Analysis
Confidence Limits (alpha = 0.05)

| | On DPMO[2] | | On Z st[3] | |
|---|---|---|---|---|
| CTQ[1] | lower | upper | lower | upper |
| T1 | — | 59,630 | 3.06 | — |
| T2 | 18,462 | 161,987 | 2.49 | 3.59 |
| T3 | 37,591 | 205,058 | 2.32 | 3.28 |
| T4 | 107,841 | 323,300 | 1.96 | 2.74 |

[1]Critical to Quality (CTQ) metric evaluated, such as takt time.
[2]DPMO = Defects per million opportunities
[3]Zst = Z short term = σ value = CpK × 3, for example a 6σ value would be 3.4 defects out of 1 million opportunities (DPMO)
[4]Zlt = Z long term, not included in confidence interval analysis Validating the improvements implemented may conclude the process of the present invention. However, it is most preferred to add a control stage to maintain the changes implemented in the assembly line. Six sigma tools such as process maps, cross training matrices, action item lists, standardization of operations, and process controls are preferably used to achieve permanent implementation of the improvement to the process.

The methods for improving process time variation for operations in a assembly line are unlimited. Many different solutions have been used during traditional Kaizen events that focus on assembly line optimization. It is preferred to consider many different solutions traditionally used in lean production to eliminate variation and balance the line, including work redistribution, work simplification through better material handling and layout, work sequencing, running overtime around bottlenecks, manpower optimization, and purchasing more equipment. The process for identifying opportunities for improvement of the present invention in combination with these solutions provides more rigorous analysis and optimization of assembly lines.

The process of the present invention is useful in identifying opportunities for improvement in any assembly line where it is desirable to optimize the line. The applications of the present invention are numerous. Examples of industries where identifying opportunities for improvement in assembly lines is applicable, includes but is not limited to, the aircraft, floor care, medical, lawn and garden, irrigation, computer, automotive, safety equipment, consumer products, lighting, and business equipment, or many other industries included in the *Standard Industrial Classification Manual*, published by the United States Government Printing Office.

All published materials cited herein are incorporated by reference.

The following examples are put forth so as to provide those of the ordinary skill in the art with a detailed disclosure and description of how the process claimed herein is evaluated, and is not intended to limit the scope of what the inventor regards as his invention.

EXAMPLES

Example 1

This example involved a production line for molding and assembly of business machines. The goal of the operation was to increase productivity by 5 percent each year for the assemblies. A production of 183 parts per production shift was necessary to meet that goal. The operation did not implement changes to optimize the assembly line. Instead, six sigma capability analysis were conducted to demonstrate the use of statistical data analysis on an assembly line, and identify the critical operations needing improvement. A capability analysis of two different assembly lines was completed. The six sigma methodology included a short gage R&R analysis to validate the repeatability and reliability of the data collected throughout the process before the capability analysis was conducted. Statistical techniques included various Minitab™ capability analyses which included obtaining values such as the mean, standard deviation and CpK. Validation of the proposed improvements included a confidence interval analysis. The results yielded excellent information on the capabilities of each line and identified opportunities for improvement. The methodology in improving the assembly line was centered around reducing and eliminating variability. The cause of the high standard deviations was determined and changes were implemented to improve the first two assembly line stations.

The steps that were taken to identify opportunities for improvement included a developing a process map of the assembly line to identify each operation and the material flow, taking initial time measurements on the assembly line, a gage R&R analysis to assure that the time measurers were taking time data accurately, taking a second set of time measurements, a calculation of the upper specification limit takt time, a capability analysis, and an analysis of the outcomes to determine future actions.

The first step in validating those doing the timing of operations and their techniques was to perform a gage R&R analysis. The short method gage R&R was used because assembly line operation cycle times can only be measured a single time. The short gage R&R method may also be modified when there is only an upper specification limit (USL) to measure the operation performance. In this case the operation being performed must below the required takt time.

Short gage R&R proceeded with two measurers measuring the time of the operation five times. That is, the operators repeated the operation five times, and each of the two measurers recorded the five times for a total of ten data points. These data points were then put in a basic spreadsheet. The initial gage R&R analysis results are shown below in Table 6:

TABLE 6

Gage R& R Analysis Initial Results

| | Part Measurements | | | |
|---|---|---|---|---|
| Parts | Individual A | Individual B | \|Range (A–B)\| | Average |
| 1 | 35.6 | 34.5 | 1.1 | 35.05 |
| 2 | 33.8 | 34.3 | 0.5 | 34.05 |
| 3 | 34 | 33.9 | 0.1 | 33.95 |
| 4 | 35.4 | 35.5 | 0.1 | 35.45 |
| 5 | 33.7 | 31.4 | 2.3 | 32.55 |
| | | Average Range: | 0.82 | |

Gage Error (GRR): 3.5506
GRR % contribution: 34.4% Red

After these measurements were taken, timing improvements were made by clarifying the start and stop points for the timing procedure. This significantly improved the reliability and reproducibility of the time measurements, thus validating these time data for further analysis of the assembly line processes. The data having improved reproducibility and reliability are shown below in Table 7:

TABLE 7

Gage R&R Analysis With Clarified Timing Procedures

| | Part Measurements | | | |
|---|---|---|---|---|
| Parts | Individual A | Individual B | \|Range (A–B)\| | Average |
| 1 | 55.8 | 55.7 | 0.1 | 55.75 |
| 2 | 57 | 57 | 0 | 57 |
| 3 | 71 | 72.5 | 1.5 | 71.75 |
| 4 | 68 | 68.2 | 0.2 | 68.1 |
| 5 | 69 | 69.2 | 0.2 | 69.1 |
| | | Average Range: | 0.4 | |

Gage Error (GRR): 1.7320
GRR % Contribution: 0.2% Green

If the gage R & R, as a percent of contribution to error, is less than 2%, the measurement system is green, or acceptable; if the gage R & R is between 2% and 7.7%, it is yellow or marginal; if the gage R & R is greater than 7.7%, it is red, or unacceptable. In Table 6 above, the gage R & R % contribution was calculated to be 34.4%. That was unacceptable. There are numerous ways to fix the gage R & R. For example, the techniques the measurers used in timing the operations were discussed. The start time and end time were defined more precisely, the data collecting procedures were changed, and a second set of measurements were taken. In the second table, Table 7 above, the gage R & R % contribution was calculated to be 0.2%. That was acceptable based on the defined criteria.

After the gage R&R measurement validation, the capability analysis using the process takt time as the performance metric was completed. The capability analysis included using a Minitab™ statistical analysis software program. There were six operations in the assembly line and ten data points were taken within each operation yielding sixty total data points. The existing process takt time calculated during the gage R&R analysis was designated as the upper specification limit at 144 seconds. This was the takt time necessary to meet the production goal of 183 parts per production shift.

The data collected from the six operations was entered into the Minitab™ program and the capability results were obtained from the corresponding graphs and charts. The results are indicated in Table 8 below:

TABLE 8

Capability Analysis Results

| Station | Ave. Time | Std Deviation | Cpk |
|---------|-----------|---------------|------|
| overall | 104.5 | 11.0 | 1.20 |
| 1 | 78.6 | 9.8 | 2.23 |
| 2 | 118.8 | 6.2 | 1.36 |
| 3 | 108.8 | 7.0 | 1.67 |
| 4 | 106.4 | 18.1 | 0.69 |
| 5 | 119.4 | 12.7 | 0.64 |
| 6 | 94.8 | 9.5 | 1.72 |

The overall CpK is 1.2, n or the number of data points is 60 (10 per individual operation), the standard deviation is 11, and the mean is 104.5. Based on these numbers at first it appeared that the overall process was capable of meeting this upper specification limit (USL), however, a thorough analysis included each of the six operations to determine if any individual operations contributed to the most variance of the overall process. The same procedure was followed for each operation in the assembly line as was conducted for the overall process capability analysis (i.e. this was done 6 times—one analysis for each of the six operations). These results are also included in Table 8 above.

There were many indications from the analysis. Referring to Table 8, the average time, standard deviation and CpK for the overall line was 104.5, 11.0 and 1.20 respectively. Any operation with significantly worse numbers than these was adversely affecting the capability of the overall process.

For example, Stations #4 & #5 appeared to be troublesome: the standard deviations were quite high (18.1 and 12.7, respectively) and the CpK's were quite low (0.69 & 0.64, respectively). This indicated a lot variation in the data and a process step that was out of control. For this reason more analysis of these two stations was necessary. For instance, the next step of the process would look at each individual operation to determine where the variability is coming from.

Referring back to the individual operation data as shown above in Table 8, the time for Station #2 was quite high but the standard deviation and CpK appeared to be acceptable. This indicated that although this station was apparently under control, however, the overall time could cause a bottleneck if the takt time (or USL) was reduced. Therefore, in order to improve this station, it would be necessary to reduce the overall time. That was suggested to be solved in several possible ways: by redistributing work (i.e. give some work to another station), improving the flow or ergonomics at the station, and speeding up or improving equipment used at this station.

In general, looking at the process capability (CpK) and the standard deviation (sigma) of each step in an assembly line was a quick way of determining the overall "efficiency" of a process. The key to process improvement was the elimination or at least minimization of variation. If standard deviations were reduced, the resultant CpK's would increase, reflecting a better and more controlled process.

After the capability analysis was conducted it was necessary to validate the proposed improvements. The confidence intervals for Z short term (Zst), and the DPMO for the overall process were evaluated comparing the current process takt time with several proposed faster overall process takt times. The following results in Table 9 was obtained when the existing takt time of 144 seconds and potential faster takt times of 132, 127 & 120 seconds/part were evaluated:

TABLE 9

Capability Analysis Validation and Confidence Interval Analysis

| $CTQ^2$ | DPMO | Yield | Shift | Zst | Zlt |
|---------|------|-------|-------|-----|-----|
| 144 Takt | 0 | 100.00% | 1.50 | — | — |
| 132 Takt | 66,667 | 93.33% | 1.50 | 3.00 | 1.50 |
| 127 Takt | 100,000 | 90.00% | 1.50 | 2.78 | 1.28 |
| 120 Takt | 200,000 | 80.00% | 1.50 | 2.34 | 0.84 |

Confidence Interval Analysis
Confidence Limits (alpha = 0.05)

| | on DPMO | | on Zst | |
|---|---|---|---|---|
| $CTQ^2$ | lower | upper | lower | upper |
| 144 Takt | — | 59,630 | 3.06 | — |
| 132 Takt | 18,462 | 161,987 | 2.49 | 3.59 |
| 127 Takt | 37,591 | 205,058 | 2.32 | 3.28 |
| 120 Takt | 107,841 | 323,300 | 1.96 | 2.74 |

$^2$CTQ = 183 parts/shift (pps) = 144 sec/unit (takt time); 200 pps = 132 takt; 210 pps = 127 takt; 220 pps = 120 takt This data indicated the process having the 144 second takt time had a capability to produce 183 parts per shift at a 100% yield rate with no defects, where a defect was defined as a time for a station greater than the takt time. To understand whether an "improved" assembly line is really improved (from a statistically significant viewpoint), the confidence limits need to be calculated on the new process and compared to the old ones calculated. If there is no overlap, then the new line would be considered statistically improved. In this case, the faster takt times ("improved") all indicated significantly higher defects per million opportunities (DPMO) values, and their confidence intervals fell within the 144 takt time (the current process USL), confidence interval. This indicated that lowering the takt times would not generate an improved assembly process. For the purposes of this example it was determined that the current process takt time of 144 was the best takt time for that particular assembly process. The identification of opportunities concluded with this step and changes were not implemented in the assembly line at this time. The purpose of the example was to show how statistical analysis is successfully implemented in assembly line optimization.

Example 2

Another example included addressing production capability on a manufacturing line for a plastic component manufacturer. The object was to use Kaizen and lean production principles during the assembly line optimization event. These principles included balancing work through takt time, continuous process flow, and pull processing from subsequent operations. The overall goal of the assembly line optimization was to produce 800 units per production shift, which required a takt time of 43 seconds per unit. To accomplish this goal, six sigma methodology and capability analysis were implemented to efficiently isolate assembly line problems and validate whether the proposed improvements would actually achieve the desired goal.

The assembly line evaluated in this example had twelve individual operations and ten individual subassemblies. Each one of these individual operations and individual subassemblies were timed to obtain the takt times for the current assembly process.

Short gage R&R analysis was conducted as in Example 1 on the overall assembly process and in subassembly operations to validate the current takt time measurements as well as ensure future measurements taken would be reliable and repeatable. Measurements were taken for Operation #4 of the assembly process and Operation H of the subsassembly process. The results below in Table 10 and Table 11 show that the measurements were within the acceptable validity limits (a gage R&R % contribution less than 2%) as specified in Example 1:

TABLE 10

Operation #4 Assembly line GAGE R&R Analysis

| Parts | Ind A | Ind B | \|Range (A–B)\| | Average |
|---|---|---|---|---|
| 1 | 19.8 | 19.9 | 0.1 | 19.85 |
| 2 | 21.4 | 21.8 | 0.4 | 21.6 |
| 3 | 22.9 | 22.4 | 0.5 | 22.65 |
| 4 | 26.9 | 27 | 0.1 | 26.95 |
| 5 | 25.8 | 26.1 | 0.3 | 25.95 |

Average Range: 0.28
Gage Error (GRR): 1.2124
GRR % Contribution: 0.7% Green

TABLE 11

Subassembly Line Operation H GAGE R&R

| Parts | IndA | IndB | \|Range (A–B)\| | Average |
|---|---|---|---|---|
| 1 | 25 | 25 | 0 | 25 |
| 2 | 23.6 | 23.8 | 0.2 | 23.7 |
| 3 | 28.4 | 28.7 | 0.3 | 28.55 |
| 4 | 28.2 | 28.6 | 0.4 | 28.4 |
| 5 | 25.1 | 25.3 | 0.2 | 25.2 |

Average Range: 0.22
Gage Error (GRR): 0.9526
GRR % Contribution: 0.8% Green

Once the data measurements were validated by short gage R&R analysis, the capability analysis of the data was conducted. Capability analysis began by identifying the upper level specification takt time. The production goal of 800 units per shift required a target upper specification limit takt time of 43 seconds.

The following results in Table 12 and Table 13 showed that several of the original assembly and subassembly processes were above the 43 second takt time limit:

TABLE 12

Existing Takt Time - Assembly
Time Required to produce a component = Available Production Time = 43 seconds

| Operation | TAKT | Operation | TAKT |
|---|---|---|---|
| 1 | 35.3 | 7 | 24.8 |
| 2 | 30.1 | 8 | 39.6 |
| 3 | 29.8 | 9 | 53.7[6] |
| 4 | 22.9 | 10 | 29.9 |
| 5 | 56.8[6] | 11 | 46.4[6] |
| 6 | 35.2 | 12 | 36.6 |

[6]problem --above 43 second takt time

TABLE 13

Existing Takt Time - Sub-Assembly
Time Required to produce a component = Available Production Time = 43 seconds

| Operation | TAKT | Operation | TAKT |
|---|---|---|---|
| A | 56.2[7] | G | 9.6 |
| B | 8.6 | H | 26.1 |
| C | 23.3 | I | 34.9 |
| D | 31.2 | J | 5.2 |
| E | 55.7[7] | | |
| F | 20.8 | | |

[7]problem - above 43 second takt time

The operators stations were exceeding the takt time. Efforts were concentrated on these operations having high takt times to balance the assembly line and subassembly lines. A capability analysis was conducted to assess how lowering takt times at the problem areas indicated in Tables 12 and 13 would actually affect the overall assembly line process. The capability analysis first analyzed the total process before any changes were implemented. FIG. 1 represents the total process capability before any changes were made. FIG. 1 also shows that the initial mean was 32.75, the initial standard deviation was 6.34, and the initial CpK was 0.53. The capability analysis data also included calculating the confidence intervals for original process. This data is represented in Table 14 below:

TABLE 14

Capability Analysis Validation and Confidence Interval Analysis for Old Production Line

| CTQ | DPMO | Yield | Shift | Zst | Zlt |
|---|---|---|---|---|---|
| Old Total Line takt time | 237,500 | 76.25% | 1.50 | 2.21 | 0.71 |

Confidence Limits (alpha = 0.05)

| | on DPMO | | on Zst | |
|---|---|---|---|---|
| CTQ | lower | upper | lower | upper |
| Old Total Line Takt Time | 185,123 | 296,485 | 2.03 | 2.4 |

Once this information was evaluated several proposed takt times were assessed to monitor the potential impact on production capacity variation. Table 15 below shows how the bottlenecks or operators exceeding takt times effected the unit per shift consistency of a process when run at proposed higher rates:

TABLE 15

Proposed Takt Time Analysis
Production Capacity, Units/hour

| Takt time, seconds | Production Capacity, Units per Shift[8] | | |
|---|---|---|---|
| | 100% | 95% | 90% |
| 35 | 977 | 928 | 879 |
| 40[9] | 855 | 812 | 770 |
| 45 | 760 | 722 | 684 |
| 50 | 684 | 650 | 616 |

[8]A shift = 10.75 hours worked
[9]40 = Takt time to focus on to reach 800 units at a 43 second takt time goal.

Table 15 shows that at a proposed takt time of 40 seconds, operating at one hundred percent capacity, could produce 855 units per shift. This verified that there was a possibility to reach the goal of 800 units per shift at a takt time of 43 seconds. However, the average for the last four production runs was 490 units/shift with a high of 588 units/shift. The inability to consistently run higher rates resulted primarily from those bottleneck operations that took longer takt times.

The next stage was to implement changes to improve the takt times of the assembly and subassembly operations. The focus was primarily on the operations exceeding the target takt time of 43 seconds, however, changes were not limited to these areas alone. Takt time improvements, in general, were made by work redistribution, process modifications, and pull production techniques. The following list provides examples of how several operations and general changes were made to improve the operations that had takt times exceeding the 43 second takt time:

Assembly Line

1. Operations 2 and 3:
   Clarified operation instructions to assure consistent performance.
2. Operation 4
   Redistributed cell layout and added packing material to station.
3. Operation 5
   Consolidated two actions from Operation 5 to Operation 4.
4. Operation 7
   Moved a subassembly part installation to Operation 7.
5. Operation 8
   Incorporated a part installation action from Operation 9.
6. Operation 9
   Organized cell layout and equipment storage.
   Added tools to improve installation aspect of operation.
7. Operation 12
   Placed two operations in same area to consolidate space and efficiently carry out two operations in one area.

Subassembly Line

1. Subassembly A
   Divided one work station into two work stations.
   Added additional tools.
   Centrally placed equipment for easier access by multiple operators.
2. Subassembly E
   Transferred to Operation 7 to shorten the takt time.
   Freed up an operator.

These changes resulted in an overall assembly line takt time of 40 seconds, yielding 850 units per shift. This was a significant reduction in takt time and went above and beyond the initial production goal of 800 units per shift.

Work in process inventory problems were solved by implementing pull production in combination with the six sigma methodology. This was a good example where lean production techniques and six sigma statistical analysis compliment each other to obtain the most efficient process. The results of the significant improvements in WIP inventory reduction are shown in Table 16 below:

TABLE 16

Work In Process Inventory

| Orig. WIP | New WIP | Reduction |
|---|---|---|
| 7 | 0 | 100% |
| 4 | 0 | 100% |
| 3 | 1 | 66.6% |
| 8 | 1 | 87.5% |
| 9 | 1 | 88.9% |
| 15 | 1 | 93.3% |
| 5 | 1 | 93.3% |
| 5 | 1 | 80% |
| 7 | 1 | 85.7% |
| 12 | 1 | 91.7% |
| 4 | 1 | 75% |
| 13 | 2 | 84.6% |
| 16 | 2 | 87.5% |
| 96 | 12 | 87.5%[10] |

[10]87.5% Note significant decrease in WIP inventory

The original WIP contributed to congestion and unnecessary operator movement. Implementing pull production in conjunction with six sigma analysis decreased the WIP by a significant 87.5%.

Figure 2:
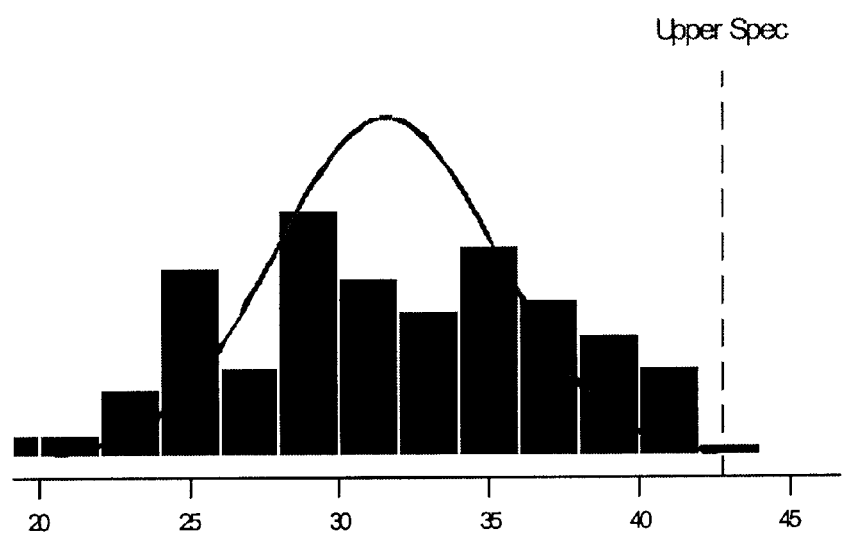
FIG. 2 depicts the total process capability and statistical data in Example 2 after changes were implemented in assembly line.

Process capability analysis for the total process after changes were made included assessing the capability curve graph in FIG. 2. This graph showed that by eliminating the high takt time values, the mean shifted as a result. This visually illustrates that an immediate reduction in takt time or overall process efficiency can be achieved by using eliminating these high values. It is then through the six sigma methodology that the individual operations can rigorously be analyzed to optimize the assembly line process. FIG. 2 shows that the mean was reduced to 31.55, the standard deviation decreased to 3.69, and the CpK increased to 1.01. The increase in CpK was an indication that the implemented improvements yielded a more controlled process compared to the original assembly process.

These improvement results were validated using statistical confidence interval calculations and are represented in Table 17 below:

TABLE 17

Capability Analysis Validation and Confidence Interval Analysis for Total Production Line After Changes

| Takt times CTQ | DPMO | Yield | Shift | Zst | Zlt |
|---|---|---|---|---|---|
| New Total Line takt time | 0 | 100% | 1.50 | — | — |

Confidence Limits (alpha = 0.05)

| | on DPMO | | on Zst | |
|---|---|---|---|---|
| CTQ | lower | upper | lower | upper |
| New Total Line Takt Time | —! | 26,005 | 3.44 | — |

To understand whether an "improved" assembly line is really improved (from a statistically significant viewpoint), the confidence limits need to be calculated on the new process and compared to the old ones calculated. If there is no overlap, then the new line would be considered statistically improved. The improvements made throughout the assembly line directly impacted the excessive takt time operations. The takt time improvements to the original problematic operations are shown in Table 18 below:

TABLE 18

Individual Operation Takt Time Improvements

| Operation | Orig Takt | New Takt |
|---|---|---|
| 5 | 56.8 | 33.1 |
| 9 | 53.7 | 37 |
| 11 | 46.4 | 25.8 |
| 12 | 50.6 | 28 |
| A | 52.6 | 28.6 |
| E | 55.7 | 27 |

The reduced takt time for the individual operations listed in Table 18, decreased the overall process takt time to 40 seconds. This resulted in the assembly process to produce 850 units per shift.

Assembly line optimization was not limited to six sigma methodology, statistics, capability analysis, and lean production. As part of a control stage, several techniques were also implemented to help maintain new changes and allow for continuous improvements to the assembly process.

For example, standard operating procedures were implemented to reduce variation in what is done in each operation. This minimized line balancing problems.

Another solution to maintain control over the new process was to train the users in one-piece flow-pull manufacturing. This also included cross training users to develop a variety of areas of expertise so that worker absenteeism did not add variation to takt times in individual operations that in turn would throw the assembly line off balance. This was tracked through the use of a training matrix or roster for each worker and was referred to when necessary.

Action items were also developed to foster continuous improvement in the assembly line process. The following list shows several examples of the action items listed and eventually implemented in this example:

Assembly Area Action Items
Station #2:
1. Remove equipment and clutter.
Station #3:
2. Add larger storage bins to overcome potential injury and worker discomfort problems.
Station #4:
3. Redesign cell layout to remove obstacles in assembly line.
Station #5:
4. Organize cell layout with shelving.
Station #6:
5. Develop methods to position component or assess ways to improve possible product damage problems during the assembly process.
Station #7:
6. Organize cell layout so that station is closer to other stations to increase efficiency in assembly line.
Station #8:
7. Add storage containers to eliminate clutter in work area.
Station #9:
8. Implement tool changes.
9. Add tools to work station to improve productivity.
Station #12:
10. Add additional stations as long as within the specified assembly line takt times.
11. Change packing materials to minimize amounts needed.
12. Automate packing and wrapping of product.
Sub-Assembly Area Action Items
Station #A
1. Improve lighting.
Station #B
2. Decrease cell layout size to eliminate wasted motions.
Station #D
3. Address duties or procedures that are difficult to carry out.
Station #F
4. Implement ergonomic or user-friendly equipment that is adjustable to every user size.

Assembly line optimization in this particular example included a significant reduction in takt time, an increase in the amount of units produced per shift, and a large decrease in work in process inventory.

Example 3

Another example focused on increasing assembly line process capability and optimizing manpower on the line. Lean production techniques were used in combination with six sigma methodology. The assembly line optimization used the following lean production techniques: balancing work through takt time, continuous process flow, and pull subsequent operations. The overall goal was to produce 1129 units per shift with a takt time less than 34 seconds (CpK 2.33).

All operations were constructed around a current takt time. Observation of the current process began with a short gage R&R measurement validation as was conducted in Example 2. The results from the short gage R&R were acceptable and the data was reliable. The following results in Table 19 below were obtained in the initial the current assembly process:

TABLE 19

Current Assembly Process

| Operation | Ave. Time | Std. Deviation | CpK |
|---|---|---|---|
| 10 | 20.04 | 1.82 | 2.61 |
| 20 | 11.75 | 1.04 | 7.24 |
| 30 | 20.33 | 0.77 | 6.04 |
| 40[11] | 38.03 | 18.68 | 0.07 |
| 50 | 22.29 | 1.72 | 2.33 |
| 60 | 17.27 | 1.25 | 4.53 |
| 70 | 23.63 | 0.52 | 6.81 |
| 80 | 15.22 | 1.56 | 4.07 |
| 100 | 17.43 | 1.51 | 3.74 |
| 110 | 19.30 | 1.68 | 2.97 |
| 120 | 21.72 | 2.39 | 1.75 |

[11]40 = Problem- the slowest takt time pacing the assembly line.

Analysis of the current process showed that the line was placed by the slowest takt time, which in this example was Operation 40 having a takt time of 38.03 seconds. In order to reach the goal of 1129 units per shift, the takt time had to fall below 34 seconds. Table 20 below includes more troublesome operations that slowed down the assembly line:

TABLE 20

Current Assembly Process Continued

| Operation | Ave. Time | Std. Deviation[12] | CpK |
|---|---|---|---|
| 130 | 24.57 | 2.06 | 1.57 |
| 140 | 30.45 | 8.23[12] | 0.16 |

TABLE 20-continued

Current Assembly Process Continued

| Operation | Ave. Time | Std. Deviation[12] | CpK |
|---|---|---|---|
| 150 | 21.85 | 3.41 | 1.22 |
| 160 | 19.10 | 2.02 | 2.50 |
| 170 | 14.23 | 2.95 | 2.27 |
| 180 | 16.54 | 0.92 | 6.46 |
| 200 | 20.91 | 4.82[12] | 0.93 |
| 210 | 29.80 | 6.01[12] | 0.25 |
| 220 | 29.30 | 4.73[12] | 0.35 |
| 230 | 29.30 | 4.73[12] | 0.35 |
| 240 | 20.88 | 1.71 | 2.62 |
| 250 | 14.35 | 2.98 | 2.23 |
| 260 | 12.96 | 1.76 | 4.05 |
| 270 | 5.29 | 0.75 | 12.85 |
| Overall | 20.01 | 4.71 | 1.01 |

[12]Standard Deviation = high standard deviations indicated problem areas

Although operations 140, 200, 210, 220, and 230 had takt times below the 34 second limit, the standard deviation and CpK values indicated a large amount of process variation and lack of process control. Therefore, capability analysis was conducted to focus on opportunities for improvement in the overall process as well as the individual operations.

Capability analysis was conducted using the current assembly takt time, the new takt time, and several other proposed takt times to validate the capability of the process meeting the various takt times. A six sigma statistical worksheet was used to calculate the data. The results are listed in Table 21 below::

TABLE 21

Capability Analysis Validation and Confidence Interval Analysis

| CTQ | DPMO | Yield | Shift | Zst | Zlt |
|---|---|---|---|---|---|
| Line A old | 44,000 | 95.60% | 1.50 | 3.23 | 1.71 |
| New Line A(34 Second Takt) | 0 | 100.00% | 1.5 | — | — |
| 32 Second Takt Time | 16,000 | 98.40% | 1.5 | 3.64 | 2.14 |
| 30 Second Takt Times | 24,000 | 97.60% | 1.50 | 3.48 | 1.98 |

Confidence Limits (alpha = 0.05)

| | on DPMO | | on Zst | |
|---|---|---|---|---|
| CTQ | lower | upper | lower | upper |
| Line A Old | 22,166 | 77,363 | 2.92 | 3.51 |
| New Line A(34 second Takt) | #NUM! | 14,647 | 3.68 | #NUM! |
| 32 Second Takt Time | 4,376 | 40,457 | 3.25 | 4.12 |
| 30 Second Takt Time | 8.857 | 51,503 | 3.13 | 3.87 |

The results in Table 21 validated that the current process (38 second takt time) was capable of meeting the 34 second takt time goal (meeting a CpK of 2.33) as indicated by the confidence interval analysis. However, it was noted that a 32 second takt time drops to a process capability (CpK) of only 1.98. The minor drop in process capability (CpK) when the proposed takt time was lowered to a 32 seconds indicated that it was possible to run a line at 32 seconds by making only minor adjustments in the assembly line. Table 22 below further illustrates the theoretical output at the various takt times evaluated in the capability analysis:

TABLE 22

Theoretical Output

| TAKT Time | Theoretical Rate/12 hr Shift[13] |
|---|---|
| 30.0 | 1,290 |
| 32.0 | 1,209 |
| 34.3 | 1,129 |
| 36.0 | 1,075 |

[13]A 12 hr shift means 10.75 available production hours. Note: The current process is capable (Cpk of 2.33) of meeting the 34.2 second takt time.

The next stage in this particular example was to generate and implement ideas to eliminate waste and improve assembly line performance based on the capability analysis results. The focus was to minimize variability, balance work of operations, and improve the layout and flow of the assembly line process. Generally, improvements focused on cell layout, process improvements, consolidation of operations, removal of unnecessary process steps, and improving material handling. The following list provides particular examples of the changes implemented in the assembly line and subsequently validated by capability analysis:

Assembly Line

Operation 10

1. Consolidated this operation into Operation 170 and 180 by moving equipment into these Operations.

Operation 40

2. Relocated Operation 40 next to Operation 50 to create pull manufacturing work flow.
3. Instructed user to follow proper work instructions and procedures to maintain consistency.

Operation 170/180

4. Eliminated handling of part by adding a automated conveyor.

Operation 140/150

5. Improved material handling by instructing users to modify placement of materials in cell layout.
6. Improved material handling efficiency by instructing users to take advantage of down time.

Operation 220

7. Ran a trial using a competitive component and reduced operation takt time.
8. Added automatic equipment to improve efficiency.

Operation 210

9. Replaced an old part with a new style part that improved process by allowing part to be place in station.

Operation 250/260

10. Combined these two operations to relocate one operator/user for each line line for each shift.

New Operation 258/259

11. Added Operation 258/259 to the assembly line.
12. Defined parameters for the Operation 258/259 to achieve a controlled process.
13. Developed standard operating procedures for Operation 258/259
14. Improved direct communication among operators by relocating operation to assembly line.
15. Added an operation procedure to improve product quality.

The adjustments and changes implemented in the current assembly process optimized the assembly line. A direct comparison of the old assembly process and the new assembly process are listed below in Table 23:

TABLE 23

Overall Improvement Results

| Operation | Ave. Time | Std. Deviation | CpK |
|---|---|---|---|
| Overall(old) | 20.01 | 4.71 | 1.01 |
| Overall(new) | 18.86 | 2.21 | 2.33 |

The changes implemented in the assembly process significantly reduced the overall process average takt time and decreased the standard deviation from 4.71 to 2.21 which indicated a large reduction in process variation. The process capability (CpK) also significantly increased after the changes were made which indicated of a more controlled process.

Assembly line optimization was not limited to six sigma methodology, capability analysis, and lean production. As part of a control stage, several techniques were also implemented to help maintain new changes and allow for continuous improvements to the assembly process.

For example, standard operating procedures were implemented to reduce variation in what is done in each operation. This minimized line balancing problems.

Action items were also developed to foster continuous improvement in the assembly line process. This following list shows several examples of the action items listed and eventually implemented in this example:

Longer Term Actions

1. Meet with supplier to discuss packaging part to aid in assembly line efficiency.
2. Develop and implement a special tool for assembly line.
3. Develop tool for easier part installation.
4. Confirm part packaging meets new assembly line requirements
5. Follow up with a supplier to see if they will refit a part to accommodate optimized assembly process.
6. Replace older parts with new ones and redistribute them in cell layout for optimal process capacity.
7. Develop a fixture prototype part assembly in the new Operation 259 and provide a cost estimate. Implement more in other assembly lines if the prototype is successful.
8. Make process modification to increase evaporation rates.
9. Asses costs associated with process waste.
10. Follow up with assembly part supplier to request a preferred orientation of packaged parts upon delivery to further optimize the assembly process.
11. New oil in stamping area from to be used from. This oil evaporates faster.
12. Retain purchasing to figure out cost associated with left shield scrap.
13. Need to see if the supplier of the I/O brackets for the chassis will supply them pre-stacked.

Overall the changes implemented as a result of the process capability analysis in this particular example significantly increased the line rate of 34 seconds to yield 1129 units per shift per line, and the line rate of 32 seconds to yield 1209 units per shift per line. There was also a significant decrease in scrap from about 0.16% to about 0.004%, an increase in total production to about 30,000 units per week, and an optimization of manpower on the assembly line.

Example 4

Another example focused on increasing assembly line process capability and optimizing manpower on the line. Lean production techniques were used in combination with six sigma methodology. The assembly line optimization used the following lean production techniques: balancing work through takt time, continuous process flow, and pull subsequent operations. The method chosen for implementing the program was Kaizen.

The evaluation began by obtaining the overall process takt time and the individual operation takt times. The data measurements were validated by short gage R&R analysis as described in Example 1. Table 24 below shows the current assembly line process time data as well as the CpK values:

TABLE 24

Current Assembly Line Process

| Operation | Ave. Time | Std. Deviation | CpK |
|---|---|---|---|
| Overall | 10.79 | 2.43 | 1.78 |
| 1 | 8.26 | 2.09 | 2.48 |
| 2 | 9.36 | 1.62 | 2.98 |
| 3 | 12.47 | 1.03 | 3.65 |
| 4 | 11.37 | 3.66 | 1.13 |
| 5[14] | 18.32 | 3.32 | 0.55 |
| 6 | 13.14 | 5.52 | 0.62 |
| 7 | 8.61 | 0.82 | 6.20 |
| 8 | 15.88 | 4.26 | 0.62 |
| 9 | 11.21 | 0.47 | 8.93 |
| 10 | 17.22 | 3.49 | 0.63 |
| 11 | 10.38 | 0.68 | 6.56 |
| 12 | 7.82 | 0.87 | 6.13 |
| 13 | 10.82 | 4.80 | 0.90 |

[14]5 = problem area

The goal in this particular example was to reach 1400 units/shift. Therefore, the individual operations must be constructed around a takt time less than 23.8 seconds. This also included analysis of the variation between the different operators running a particular operation in the assembly line as shown in Table 25 below:

TABLE 25

Assembly Line Process Time Continued

| Operation | Ave. Time | Std. Deviation | CpK |
|---|---|---|---|
| A | 9.84 | 0.90 | 5.17 |
| B | 9.90 | 2.16 | 2.15 |
| C[15] | 4.72 | 0.52 | 12.22 |
| D | 9.62 | 0.93 | 5.07 |
| E | 9.23 | 0.88 | 5.55 |
| F | 8.75 | 1.46 | 3.47 |
| G | 10.58 | 0.45 | 9.89 |
| H | 9.35 | 1.70 | 2.84 |

[15]C = high process capability (CpK) indicated possibility to redistribute work in operations.

The large variation in operation time for the same assembly line operation represents an opportunity for improvement. Operation C in the assembly line represented in Table 33 above had a significantly high process capability. This indicated an opportunity to free up two operators by work redistribution.

Further analysis of the line was conducted focusing the particular Operation 5 subassembly process. Table 26 below indicates the more specific problem areas:

TABLE 26

Operation 5 Subassembly Analysis

| Operation | Ave. Time | Std. Deviation | CpK |
|---|---|---|---|
| 5 Subassembly | | | |
| Overall | 15.65 | 2.48 | 1.09 |
| Part 1 | 13.24 | 1.49 | 2.37 |
| Part 2 | 18.35 | 3.13 | 0.58 |
| Part 3[16] | 10.32 | 0.53 | 8.55 |
| Part 3 (expanded) | | | |
| Average | 41.28 | 2.10 | 8.55 |
| Operator 1 | 46.0 | 5.6 | 2.92 |
| Operator 2 | 51.33 | 7.07 | 2.07 |
| Operator 3 | 32.3 | 2.37 | 8.9 |
| Operator 4 | 35.4 | 2.73 | 7.9 |

[16]Part 3 = indicates that improvement to assembly line can potentially yield targeted process goals.

Part 3 is one of the components that makes up the Operation 5 subassembly process. That particular component showed a large amount in variability in the operator's times. Since the operation had a high process capability as well, this was a potential area to optimize manpower on the line.

Capability analysis followed by noting the current process takt time of 23.8 seconds and the current CpK of 1.78. The approach was to first reduce variability in the bottleneck operations. Then the evaluation included determining the process capabilities as potentially faster takt times. Table 27 below represents the various takt times used for the capability analysis.

TABLE 27

Proposed Takt Times to Predict Process Capability

| TAKT Time | Theoretical Rate/10.5 hr Shift[17] |
|---|---|
| 18.0 | 1,850 |
| 20.0 | 1,665 |
| 23.8 | 1,400 |
| 25.0 | 1,332 |

[17]Shift = 10.75 hours per 12 hour shift.

Validation of the changes implemented and proposed were also included in this particular example. The confidence intervals for the current process as well as the new changes were evaluated similar to the procedures in the previous Examples 1, 2, or 3. Table 28 shows the confidence interval results:

TABLE 28

Capability Analysis Validation and Confidence Interval Analysis

| CTQ | DPMO | Yield | Shift | Zst | Zlt |
|---|---|---|---|---|---|
| Old 23.8 Takt Time | 19,048 | 98.10% | 1.5 | 3.57 | 2.07 |
| Old 20.0 Takt Time | 28,571 | 97.14% | 1.5 | 3.4 | 1.90 |
| New 23.8 Takt Time | 0 | 100.00% | 1.5 | — | — |
| New 22.0 Takt Time | 0 | 100.00% | 1.5 | — | — |

TABLE 28-continued

Confidence Limits (alpha = 0.05)

| | on DPMO | | on Zst | |
|---|---|---|---|---|
| CTQ | lower | upper | lower | upper |
| Old 23.8 Takt Time | 5,214 | 48,049 | 3.16 | 4.06 |
| Old 20.0 Takt Time | 10,556 | 61,148 | 3.05 | 3.81 |
| New 23.8 Takt Time | #NUM! | 18,275 | 3.39 | #NUM! |
| New 22.0 Takt Time | #NUM! | 18,275 | 3.59 | #NUM! |

The overlapping confidence intervals in Table 28 above indicated that by maintaining the 23.8 takt time and eliminating process operators does not significantly change the process. Also the lower 22 second takt time would not impart significant changes to the process either, such as causing bottlenecks.

Each operation indicating the highest variation was the focus for optimizing the assembly line and manpower. The results for each individual assembly operation were evaluated in the capability analysis to produce the overall effects indicated in Table 29. The results for individual Operations C, 3, and 4 can be found in Table 29 below:

TABLE 29

Operation C, 3, and 4 Individual Improvements

| Operation | Ave. Time | Std. Deviation | CpK |
|---|---|---|---|
| C (old) | 12.47 | 0.52 | 12.22 |
| C (new) | eliminated | | |
| 3 (old) | 12.47 | 1.07 | 3.65 |
| 3 (new) | 12.36 | 1.44 | 2.66 |
| 4 (old) | 11.37 | 3.66 | 1.13 |
| 4 (new) | 15.34 | 2.36 | 1.20 |

The operator from Operation C was eliminated and the work was redistributed to Operation 3. Operator 3 was then moved closer to 2 to reduce reaching and work in process inventory (WIP). Another change redistributed the work between Operations 3 and 4. Several tools were also added to improve manpower efficiency. The average time, standard deviation and CpK of the new set ups did not cause significant changes as indicated by the confidence intervals for the overall process in Table 28 above.

Operation 5 was another area targeted to make improvements in the assembly line. The change implemented was using a different operator. It was the further scrutiny of the capability analysis employed in this Example that determined the variation in operator performance. Using the different operator for this operation significantly improved the process capability (CpK) and the average process time, and reduced the standard deviation. The results are shown in Table 30 below:

TABLE 30

Operation 5 Individual Improvements

| Operation | Ave. Time | Std. Deviation | CpK |
|---|---|---|---|
| 5 (old) | 18.32 | 3.32 | 0.55 |
| 5 (new) | 15.40 | 2.21 | 1.79 |

Operation 6 was also targeted in the assembly line analysis and the following improvements are shown below in Table 31:

TABLE 31

Operation 6 Individual Improvements

| Operation | Ave. Time | Std. Deviation | CpK |
|---|---|---|---|
| 6 (old) | 13.14 | 5.52 | 0.64 |
| 6 (new) | 16.39 | 1.38 | 1.79 |

There was a significant decrease in standard deviation as a result of switching the operator working on that particular part of the assembly.

Operations 7 and 8 were consolidated into one operation. Operation 7 was moved to where Operation 8 was located. The resulting changes can be found in Table 32 below:

TABLE 32

Operations 7 and 8 Individual Improvements

| Operation | Ave. Time | Std. Deviation | CpK |
|---|---|---|---|
| 7 (old) | 8.61 | 0.82 | 6.20 |
| 7 (new) | 12.53 | 1.01 | 3.41 |
| 8 (old) | 15.88 | 4.26 | 0.62 |
| 8 (new) | 11.37 | 0.76 | 5.42 |

The consolidation of the two operations resulted in significantly improving Operation 8 process times and made Operation 7 process times more acceptable. The process capability (CpK) of the operations indicated a more controlled process and the standard deviation of Operation 8 was significantly reduced.

Operation 10 involved changing the configuration of a particular component of the process to improve flow. The improvements are shown below in Table 33:

TABLE 33

Operation 10 Individual Improvements

| Operation | Ave. Time | Std. Deviation | CpK |
|---|---|---|---|
| 10 (old) | 17.22 | 3.49 | 0.63 |
| 10 (new) | 12.71 | 0.73 | 5.06 |

The standard deviation was significantly reduced. The process capability and the average process time improved significantly as well.

The individual operation analysis was not limited to the main assembly line. The Operation 5 Sub-Assembly line was improved by adding new equipment. Table 34 below shows the resulting changes:

TABLE 34

Operation 5 Sub-Assembly

| Operation | Ave. Time | Std. Deviation | CpK |
|---|---|---|---|
| Part 3 (old) | 18.35 | 3.13 | 0.58 |
| Part 3 (new) | 7.87 | 0.76 | 6.99 |

Only a few minor changes were needed to the facilitate installation of the part component. As a result, the standard deviation was reduced and the process capability of the operation was significantly improved.

All of the individual operation changes resulted in an overall improved assembly line process. Table 35 below shows the overall process changes:

TABLE 35

Overall Line Statistics

| | Mean | Std Deviation | CpK | Parts/shift |
|---|---|---|---|---|
| Old @ 23.8 T/T | 10.79 | 2.43 | 1.78 | 1400 |
| New @ 23.8 T/T | 11.12 | 1.79 | 2.37 | 1400 |
| New @ 22.0 T/T | 11.12 | 1.79 | 2.10 | 1550 |

Based on the current performance of the line as a result of these changes, it was recommended that a Takt time of 22 seconds be used and a shift output of 1550 units be established.

Assembly line optimization was not limited to six sigma methodology, capability analysis, and lean production. As part of a control stage, several techniques were also implemented to help maintain new changes and allow for continuous improvements to the assembly process. For example, action items were developed to foster continuous improvement in the assembly line process. This following list shows several examples of the action items listed and eventually implemented in this example:

Longer Term Actions
1. Complete investigation of use of different types of equipment to improve feeder operation.
2. Complete repair of all fixtures used on assembly line.
3. Implement more ergonomic equipment to reduce the number of time operator need to carry out a function. Thus improving the operator's time variability.
4. Provide clothing adapted to worker needs.
5. Investigate possibility of combining 2 more operators thus freeing up one more person.
6. Add hanging tools for easier application to operation task.
7. Assign experienced operators to stations requiring a higher level of skill.

Other control measures to maintain the changes implemented in the assembly line included logging reasons why takt times were not being met, using visual control boards to keep track of hourly production to takt time, setting up preventative maintenance programs, minimizing the overall line length to reduce WIP, helping operators pace themselves in the pull production system, and developing standard operating procedures.

The overall benefits achieved from identifying opportunities for improvement in this example included optimizing manpower by consolidating 2 operations into one and increasing the line rate by 100 units per shift. More particularly this meant at two shifts a day for assembly lines there was an increase of about 100 units per day. This was about a 25% increase in margin for the year compared to the old process.

Although the description above contains many specific examples and details, these should not be construed as limiting the scope of the invention but as merely providing illustrations of some of the presently preferred embodiments of this invention. Thus the scope of the invention should be determined by the appended claims and their legal equivalent, rather than by the examples given.

What is claimed is:

1. A process for identifying opportunities for improvement in assembly line production which opportunity is a defect in an assembly line comprising an operation time that takes longer than an overall process tact time, said process comprising the steps of:

(1) collecting data accurately measuring operations in an assembly line;

(2) conducting a capability analysis of the data collected in step (1) to identify key opportunities for improving operations;

(3) identifying changes in operations based on the analysis in step (2); and (4) implementing changes identified in step (3) into operations to produce improved line performance.

2. The process of claim 1, further comprising the step of validating the changed operations of step (4) to identify the extent of improvements in operations and determine where other key opportunities for increasing operations may occur.

3. The process of claim 1, wherein identifying changes in step (3) comprises improving those activities that yielded the highest operation data values in any given set of data obtained from step (1) to decrease the standard deviation values and to shift the mean values lower than those originally obtained from step (2).

4. The process of claim 1, wherein the capability analysis of step (2) is a function of mean, standard deviation, and CpK values for the measured operations.

5. The process of claim 1, wherein the CpK values are determined by the calculation, $$CpK = \frac{\min(USL - mu)}{3 \text{ sigma}}$$

where,

USL=upper specification limit;

mu=mean; and sigma=the Short Term standard deviation (within lot) versus Long Term standard deviation (between lots).

6. The process of claim 1, wherein the capability analysis of step (2) comprises calculating a first set of confidence interval limits based on the original data.

7. The process of claim 1, wherein validating changed operations in step (4) comprises calculating a second set of confidence interval limits based on the operation after improvements have been made and comparatively verifying that the first set of confidence interval limits does not overlap the second set of confidence intervals.

8. The process of claim 1, wherein the operations measured include the time to complete each operation in the assembly line.

9. The process of claim 6, wherein the time to complete each operation in the assembly line is based on the tact time.

10. The process of claim 6, wherein the time complete each operation in the assembly line is less than or equal to the tact time designated as the upper specification limit tact time.

11. The process of claims 1 or 2 wherein the data measurement validation of step (1) comprises gage R&R analysis.

12. The process of claims 1 or 2 wherein the data measurement validation of step (1) comprises short form gage R&R analysis.

13. The process of claim 11, wherein the short gage R&R analysis comprises at least one pair of measurers timing at least one operation five times producing a set of ten data points for each operation evaluated.

14. The process of claims 1 or 2 wherein the capability analysis of step (2) calculates the capability of the overall assembly process.

15. The process of claims 1 or 2, wherein the capability analysis of step (2) evaluates the capability of each individual operation to meet tact time.

16. The process of claims 1 or 2, further comprising a control step for validating changes implemented in step (4).

17. The process of claim 14, wherein the control for validating changes implemented in step (4) is selected from the group consisting of action item lists, standard operating procedures, and worker cross training matrices, or any combination thereof.

18. The process of claims 1 or 2, wherein the assembly line production comprises techniques based on lean production and traditional manufacturing.

19. The process of claims 1 or 2, wherein the assembly line comprises at least two operations manufacturing in a sequence.

20. The process of claim 17, wherein the assembly line is automated.

21. The process of claim 17, wherein the assembly line is non-automated.

22. The process of claims 1 or 2, wherein the assembly line comprises at least two operators manufacturing in a sequence.

23. The process of claims 1 or 2, wherein the changes implemented in step (4) comprises reducing process time variability.

24. The process of claim 23, wherein changes reducing process time variability are selected from the group consisting of balancing assembly operations to reduce bottlenecks, improving cell layout, improving process flow, consolidating assembly operations, and redistributing operators, or any combination thereof.

25. A process for identifying opportunities for improvement in assembly line production during a Kaizen event, said method comprising the steps of:

(1) selecting an assembly line having at least two operators manufacturing in a sequence;

(2) validating time data collected for the overall process and each operation on the assembly line through short gage R&R analysis;

(3) conducting a capability analysis of the time data collected in step (2) by calculating the mean, standard deviation, CpK, and a first set of confidence intervals to identify opportunities for improvement in the assembly line;

(4) identifying changes in operations based on the analysis of step (3) by eliminating the process time values in any given set of data that are greater than an upper specification tact time obtained from step (2) to decrease the standard deviation values of that operation and to shift the mean values lower than those originally obtained from step (2);

(5) reducing process time variation identified in step (3) implementing changes selected from the group consisting of balancing assembly operations to reduce bottlenecks, improving cell layout, improving process flow, work simplification through better material handling, purchasing more equipment, consolidating assembly operations, and redistributing operators, or any combination thereof;

(6) validating changes implemented in step (4) by calculating a second set of confidence intervals based on the improved assembly line process to compare with the first set of confidence intervals from step (2), wherein the second set of confidence intervals do not overlap with the first set of confidence intervals;

(7) implementing a control means maintaining the changes implemented in step (5); and (8) repeating the process cycle to continually improve the assembly line process.

* * * * *